(12) United States Patent
Liu et al.

(10) Patent No.: US 10,518,457 B2
(45) Date of Patent: Dec. 31, 2019

(54) CROSSHEAD DIE

(71) Applicant: The Goodyear Tire & Rubber Company, Akron, OH (US)

(72) Inventors: Hon Ho Liu, Akron, OH (US); Deep Samanta, Copley, OH (US); Srinath Madhavan, Canton, OH (US); Hongbing Chen, Broadview Heights, OH (US); Christopher David Dyrlund, Canton, OH (US); Gary Robert Burg, Pawleys Island, SC (US)

(73) Assignee: The Goodyear Tire & Rubber Company, Akron, OH (US)

( * ) Notice: Subject to any disclaimer, the term of this patent is extended or adjusted under 35 U.S.C. 154(b) by 468 days.

(21) Appl. No.: 15/161,319

(22) Filed: May 23, 2016

(65) Prior Publication Data

US 2017/0334119 A1    Nov. 23, 2017

(51) Int. Cl.
    *B29C 48/30*    (2019.01)
    *B29C 48/156*   (2019.01)
    (Continued)

(52) U.S. Cl.
    CPC ............ *B29C 48/30* (2019.02); *B29C 48/156* (2019.02); *B29C 48/307* (2019.02); *B29C 48/34* (2019.02); *B29C 70/16* (2013.01); *B29C 70/548* (2013.01); *B29D 30/00* (2013.01); *B29C 48/07* (2019.02); *B29C 48/2566* (2019.02);
    (Continued)

(58) Field of Classification Search
    CPC ....... B29C 47/12; B29C 47/128; B29C 47/14; B29C 47/145; B29C 48/15; B29C 48/30; B29C 48/304; B29C 48/305; B29C 48/307; B29C 48/31; B29C 48/313; B29C 48/705; B29C 48/154; B29C 48/156
    See application file for complete search history.

(56) References Cited

U.S. PATENT DOCUMENTS 3,997,285 A    12/1976   Miyazaki
4,150,929 A     4/1979   Brandt
               (Continued)

FOREIGN PATENT DOCUMENTS

EP    503541 A1     9/1992
EP    2253450 A1   11/2010
              (Continued)

OTHER PUBLICATIONS

EPO Search Report.
Chinese search report.

*Primary Examiner* — Robert C Dye
*Assistant Examiner* — Sonny V Nguyen
(74) *Attorney, Agent, or Firm* — Edward T. Kennedy (57) ABSTRACT

The invention is directed to a crosshead die for the extrusion of a profile, such as a uniform ply coat for a tire. The crosshead die is used with an extruder, and includes a body. An inlet is formed in the body, and is in fluid communication with the extruder. An outlet and a flow channel are also formed in the body. The flow channel extends between the inlet and the outlet, and is bounded by an upper wall, a lower wall, a first side wall, and a second side wall. The flow channel is formed with a bend and a cross section that includes a trapezoidal shape to align the flow of elastomer with the center of the flow channel.

8 Claims, 6 Drawing Sheets

(51) Int. Cl.
  B29C 48/305 (2019.01)
  B29C 48/34 (2019.01)
  B29C 70/16 (2006.01)
  B29C 70/54 (2006.01)
  B29D 30/00 (2006.01)
  B29C 48/07 (2019.01)
  B29C 48/25 (2019.01)
  B29K 21/00 (2006.01)
  B29K 105/00 (2006.01)
  B29K 105/10 (2006.01)

(52) U.S. Cl.
  CPC .... *B29C 48/25686* (2019.02); *B29C 48/3001* (2019.02); *B29K 2021/00* (2013.01); *B29K 2105/0067* (2013.01); *B29K 2105/10* (2013.01)

(56) References Cited

U.S. PATENT DOCUMENTS

| | | | |
|---|---|---|---|
| 4,274,821 A | 6/1981 | Kiemer | |
| 4,789,511 A * | 12/1988 | Bilgin | B01F 5/0646 264/108 |
| 4,948,354 A * | 8/1990 | Minaudo | B29C 48/30 425/114 |
| 5,259,746 A | 11/1993 | Minuado | |
| 5,389,324 A * | 2/1995 | Lewis | B29C 47/0021 264/1.6 |
| 7,056,110 B2 | 6/2006 | Abdallah | |
| 7,198,744 B2 * | 4/2007 | Peronnet-Paquin | B29C 48/307 264/173.11 |
| 8,585,949 B2 | 11/2013 | Ponta et al. | |
| 9,120,262 B2 | 9/2015 | Ponta et al. | |
| 2005/0208167 A1* | 9/2005 | You | B60C 19/08 425/133.5 |
| 2014/0272417 A1* | 9/2014 | Zeidan | B29C 48/287 428/407 |
| 2015/0283750 A1* | 10/2015 | Kenny | B29C 48/154 264/171.24 |
| 2016/0059466 A1 | 3/2016 | Dyrlund et al. | |
| 2016/0176096 A1 | 6/2016 | Dyrlund et al. | |

FOREIGN PATENT DOCUMENTS

FR 2682635 A1 4/1993
JP 2005246736 9/2005

* cited by examiner

|  | Baseline | DM1 | DM2 |
|---|---|---|---|
| P (inlet), psi | 4,223.9 | 4,531.9 | 4,727.9 |
| Fract. die exit flow (inner radial half) | 0.505 | 0.500 | 0.496 |
| Fract. die exit flow (outer radial half) | 0.495 | 0.500 | 0.504 |

FIG-9

CROSSHEAD DIE

FIELD OF THE INVENTION

The invention relates to pneumatic tires, and more particularly, to equipment for the extrusion of profiles, such as ply structures for tires. Specifically, the invention is directed to an improved crosshead die, which may be employed in the extrusion of profiles such as a uniform ply coat for a tire.

BACKGROUND OF THE INVENTION

It is to be understood that reference herein is made to the extrusion of a ply or a ply coat for a tire by way of example, as the invention applies to the extrusion of any profile. Modern passenger tires are typically constructed utilizing two or more layers of plies. Each ply usually includes a plurality of parallel reinforcement cords that are encased in a layer of an elastomer. Due to this structure, a standard ply has a rectangular cross section.

To manufacture a ply, an elastomer is processed by an extruder, and the processed or molten elastomer is fed or flowed to a crosshead die. The reinforcement cords are also fed into the crosshead die, where they are encased in the molten elastomer. A profile die is mounted on the exit portion of the crosshead die and includes a rectangular opening that sets the final cross-sectional shape and size of the extruded ply.

In the prior art, the flow path or channel inside the crosshead die for the molten elastomer has included a cross-sectional shape that is rectangular in order to approximate the shape of the opening of the profile die. Because the reinforcement cords must pass through the crosshead die in a straight, aligned manner, the flow channel for the molten elastomer is formed with a bend, which is usually 90 degrees. The combination of the rectangular cross section and the 90 degree bend creates a differential in the flow rate of the molten elastomer inside of the crosshead die, with the elastomer on the inside of the bend flowing more rapidly than the elastomer on the outside of the bend.

Such a differential in flow rate has led to non-uniform flow of the elastomer as it reaches the profile die, which results in a less-than optimum cross section for the ply. More particularly, due to the 90 degree bend, the actual flow of the molten elastomer tends to be centered at a point that is closer to the inside of the flow channel, rather than aligning with the center of the flow channel. It is desirable for the actual flow of an extruded ply to align with the center of the flow channel to create a uniform melt through the cross section of the ply, which optimizes the characteristics of the ply.

Therefore, it is desirable to provide a crosshead die for the extrusion of a profile, such as a ply coat for a tire, which includes a structure which aligns the actual flow of elastomer with the center of the flow channel to create a uniform melt through the cross section of the profile, thereby optimizing the characteristics of the extruded profile.

SUMMARY OF THE INVENTION

According to an aspect of an exemplary embodiment of the invention, a crosshead die for use with an extruder includes a body. An inlet is formed in the body and is in fluid communication with the extruder. An outlet and a flow channel are also formed in the body. The flow channel extends between the inlet and the outlet and is bounded by an upper wall, a lower wall, a first side wall, and a second side wall. The flow channel is formed with a cross section that includes a trapezoidal shape.

In another aspect of an exemplary embodiment of the invention, a method of extruding a profile using a crosshead die includes the steps of providing an extruder and providing a crosshead die. The crosshead die includes a body and a flow channel formed in the body. The flow channel is bounded by an upper wall, a lower wall, a first side wall, and a second side wall, in which the flow channel is formed with a cross section that includes a trapezoidal shape. A crosshead die is operatively connected to the extruder, and an elastomer is processed in the extruder. The elastomer is flowed into the flow channel of the crosshead die and urged through the flow channel. A profile shape is formed with a profile die that is removably mounted to the body of the crosshead die.

BRIEF DESCRIPTION OF DRAWINGS

The invention will be described by way of example and with reference to the accompanying drawings, in which.

Similar numerals refer to similar parts throughout the drawings.

DETAILED DESCRIPTION OF THE INVENTION

Figure 1:
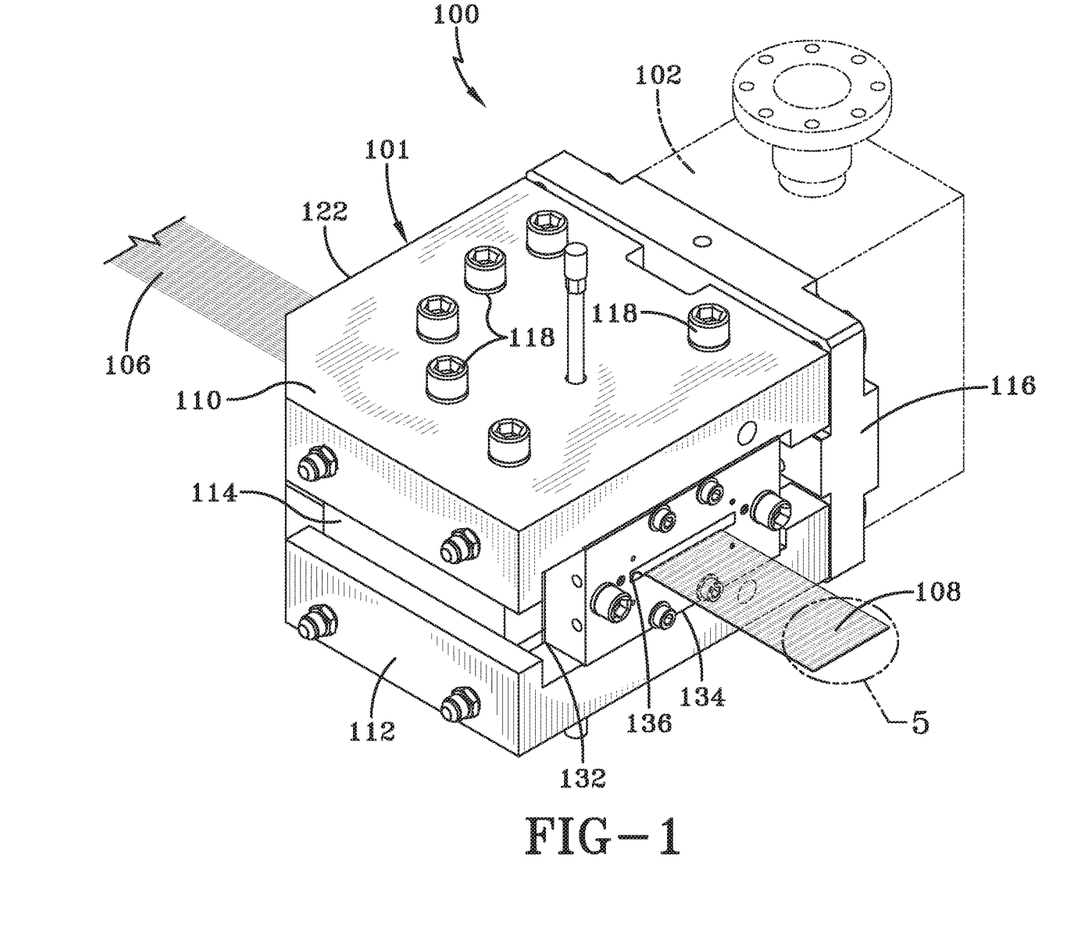
FIG. 1 is a perspective view of an exemplary embodiment of the crosshead die of the present invention, shown with a gear pump assembly in phantom.

An exemplary embodiment of a crosshead die of the present invention is indicated generally at 100 and is shown in FIG. 1. The crosshead die 100 typically is connected to an extruder (not shown) as known in the art. A gear pump 102, shown in phantom, may be connected to the crosshead die 100 between the extruder and the die. The extruder and the gear pump 102 process and melt an elastomer 104 (FIG. 5), which is fed or flowed to the crosshead die 100. A plurality of parallel reinforcement cords 106 are also fed into the crosshead die 100 and are encased with molten elastomer to form a ply 108.

Figure 2:
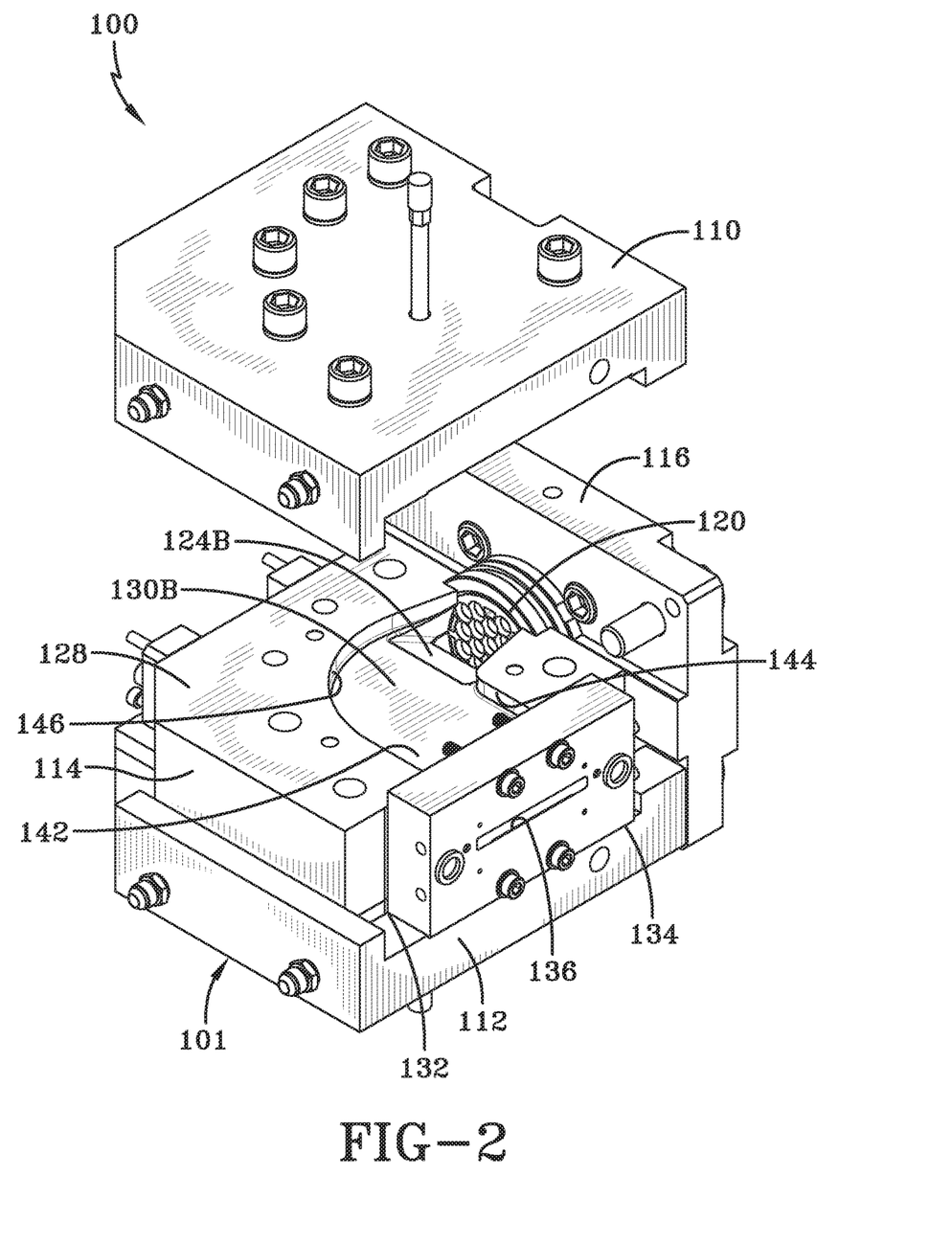
FIG. 2 is a perspective, partially exploded view of the crosshead die of FIG. 1 showing a lower portion of the flow channel formed in the die.

The crosshead die 100 includes a body 101, which preferably in turn includes an upper support block 110, a lower support block 112, and an interior section 114. An elastomer inlet section 116 is located on one side of the crosshead die 100. The elastomer inlet section 116, the upper support block 110, the lower support block 112, and the interior section 114 are all removably interconnected by means known in the art such as mechanical fasteners 118. As shown in FIG. 2, the inlet section 116 of the crosshead die 100 preferably includes a screen filter 120. The inlet section 116 is easily removed from the rest of the crosshead die 100 to enable easy access to the screen filter 120 for repair or replacement.

The crosshead die 100 also includes a removable cassette 138 (FIG. 4) for aligning the feed of the reinforcement cords 106 into a cord inlet side 122 of the die. The cassette feeds the cords 106 into the crosshead die 100 in parallel, spaced alignment. The crosshead die 100 is also equipped as known in the art for heating and/or cooling as needed based upon specific processing and design requirements.

Figure 3:
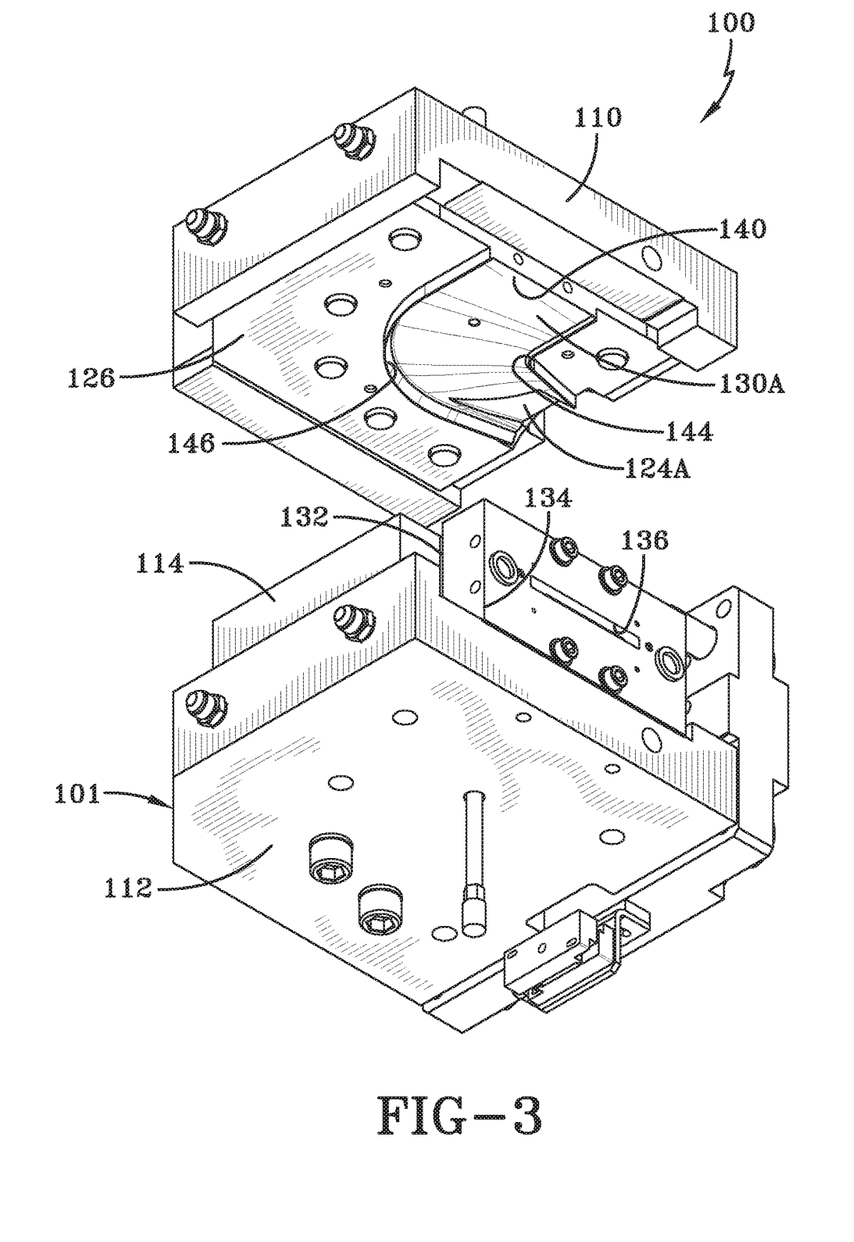
FIG. 3 is a perspective, partially exploded view of the crosshead die of FIG. 1 showing an upper portion of the flow channel formed in the die.

With reference now to FIGS. 2 and 3, the upper support block 110 includes an upper insert plate 126 that may be removable from the remainder of the upper support block, and the interior section 114 includes a lower insert plate 128 that may be removable from the remainder of the interior section 114. An inlet channel 124A, B is formed in the upper insert plate 126 and in the lower insert plate 128, with the upper portion of the inlet channel 124A being formed in the upper insert plate and the lower portion of the inlet channel 124B being formed in the lower insert plate. The inlet channel 124A, B receives the elastomer from the extruder or the gear pump 102.

The inlet channel 124A, B communicates the elastomer to the flow path formed in the crosshead die 100. More particularly, an upper portion of a flow channel 130A is formed in the upper insert plate 126, and a lower portion of the flow channel 130B is formed in the lower insert plate 128. As will be described in greater detail below, the flow channel 130A, B is formed with a 90 degree flow path as it extends through the body 101 of the crosshead die 100.

At an exit 132 of the crosshead die 100, a profile die 134 is removably mounted to the crosshead die. The profile die 134 is formed with a rectangularly-shaped opening 136 that sets the cross-sectional shape and size of the extruded ply 108 (FIG. 1). The rectangular opening 136 of the profile die 134 typically is about 80 millimeters (mm) wide and about 1.24 mm high.

The flow channel 130A, B is bounded by an upper wall 140 and a lower wall 142. With additional reference to FIG. 4, the flow channel 130A, B is bounded on each side by a first side wall 144 and a second side wall 146. As mentioned above, the reinforcement cords 106 (FIG. 1) pass through the crosshead die 100 in a straight, aligned manner from the cassette 138 to the profile die 134. Because of the straight alignment of the cords 106, the flow channel 130A, B is formed with a 90 degree bend 148.

Figure 6:
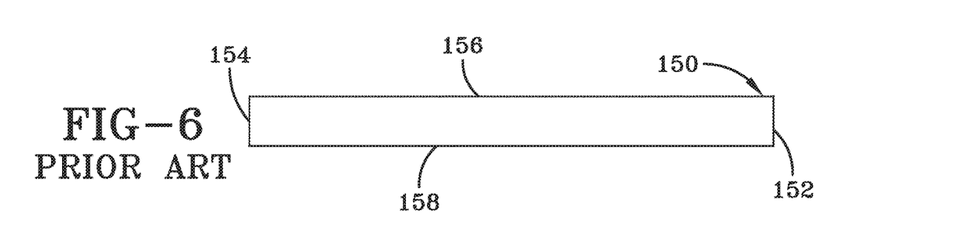
FIG. 6 is a schematic view of an exemplary cross-sectional shape of a prior art flow channel of a crosshead die.

In a prior art crosshead die configuration, the cross section of the flow channel, indicated as 150 in FIG. 6, is rectangular. More particularly, the cross section of the prior art flow channel 150 includes a first side 152 and a second side 154 that are the same height, and a top 156 and bottom 158 that are the same length. For example, the height of each one of the first side 152 and the second side 154 is about 11 mm, and the length of each one of the top and bottom is about 80 mm. A ratio of the height of the first side 152 to the height of the second side 154 thus is 1:1, or when expressed as a percentage, 100 percent.

This size and shape approximates the shape of the opening 136 (FIG. 1) of the profile die 134. The combination of the prior art rectangular cross section 150 and the 90 degree bend, however, creates a differential in the flow rate of the elastomer in the prior art crosshead die. The elastomer on the inside of the flow channel bend flows more rapidly than the elastomer on the outside of the bend, which results in a less-than optimum cross section for the resulting ply.

In the crosshead die 100 of the present invention, the length of the first side wall 144 along the flow channel 130A, B is longer than the length of the second side wall 146 along the flow channel due to the 90 degree bend 148. Based on this difference in length, there is a longer fluid flow path along the second side wall 146, which in the prior art created a higher flow resistance and thus a slower velocity for the elastomer 104 as compared to the path along the first side wall 144. In order to provide an extruded ply 108 with a uniform coating thickness and a uniform melt to optimize the characteristics of the ply, the crosshead die 100 of the present invention creates a uniform volumetric flow rate per unit section width.

Figure 4:
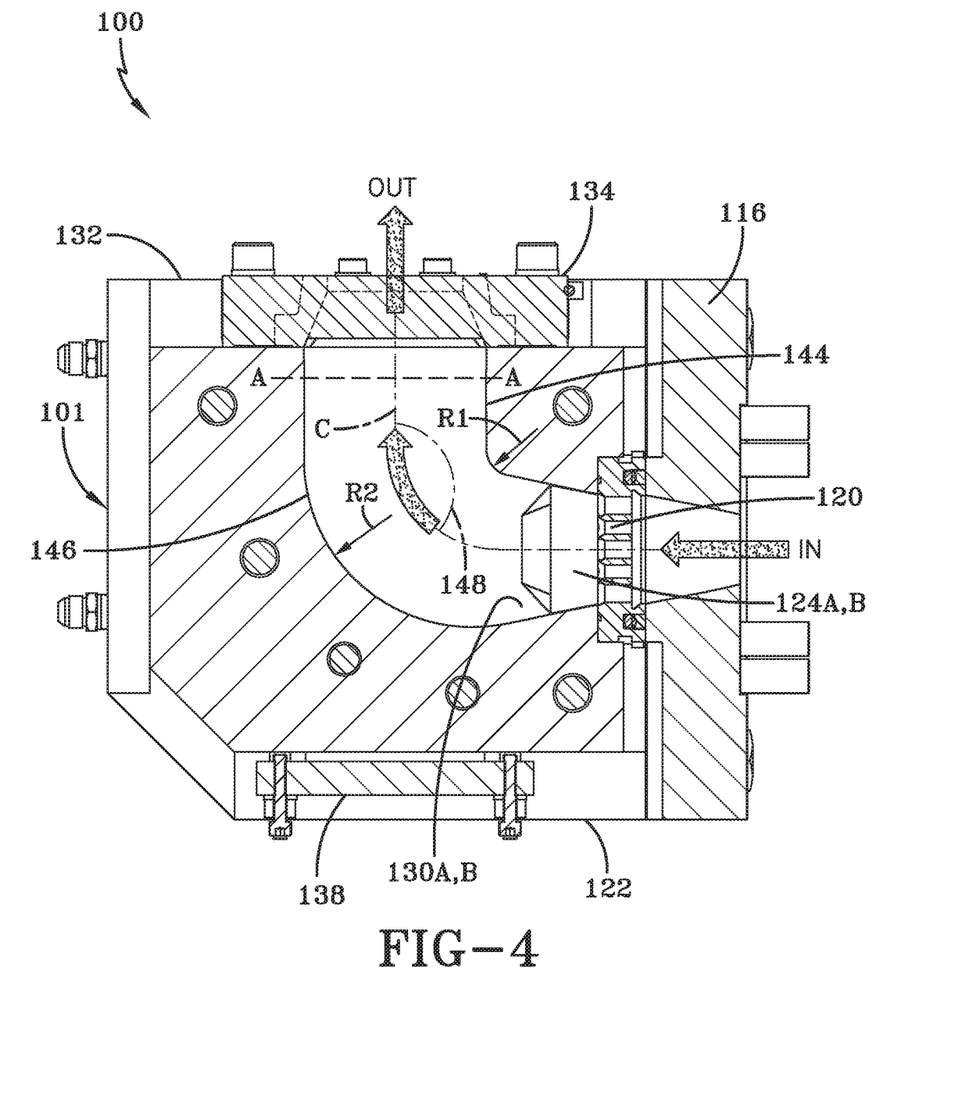
FIG. 4 is a cross sectional plan view of the crosshead die of FIG. 1 showing the flow path formed in the die.
Figure 7:
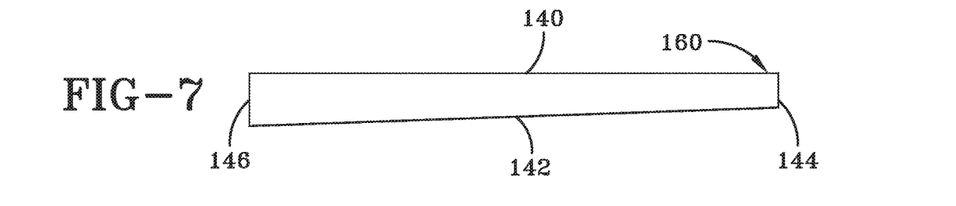
FIG. 7 is a schematic view of the cross-sectional shape of the flow channel of the crosshead die shown in FIG. 4 taken at line A-A.

More particularly, with reference to FIG. 4, the flow channel 130A, B of the crosshead die 100 of the invention is formed with a cross section 160 that includes a trapezoidal shape. The cross section 160 as taken along line A-A of FIG. 4 is shown in FIG. 7. The first side wall 144 and the second side wall 146 of the flow channel 130A, B are parallel in relation to one another, while the upper channel wall 140 and the lower channel wall 142 of the flow channel are oblique in relation to one another, that is, not parallel to one another. By way of example, the length of the upper wall 140 may be about 80.0 mm, and the height of the second side wall 146 may be about 11 mm, while the height of the first side wall 144 may be about 7 mm, and the length of the lower wall may be about 80.1 mm. A ratio of the height of the first side wall 144 to the height of the second side wall 146 thus is 7:11 or, when expressed as a percentage, about 63.6 percent. Therefore, the height of the first side wall 144, which is on the inside of the bend 148, is about 63.6 percent of the height of the second side wall 146, which is on the outside of the bend.

Figure 5:
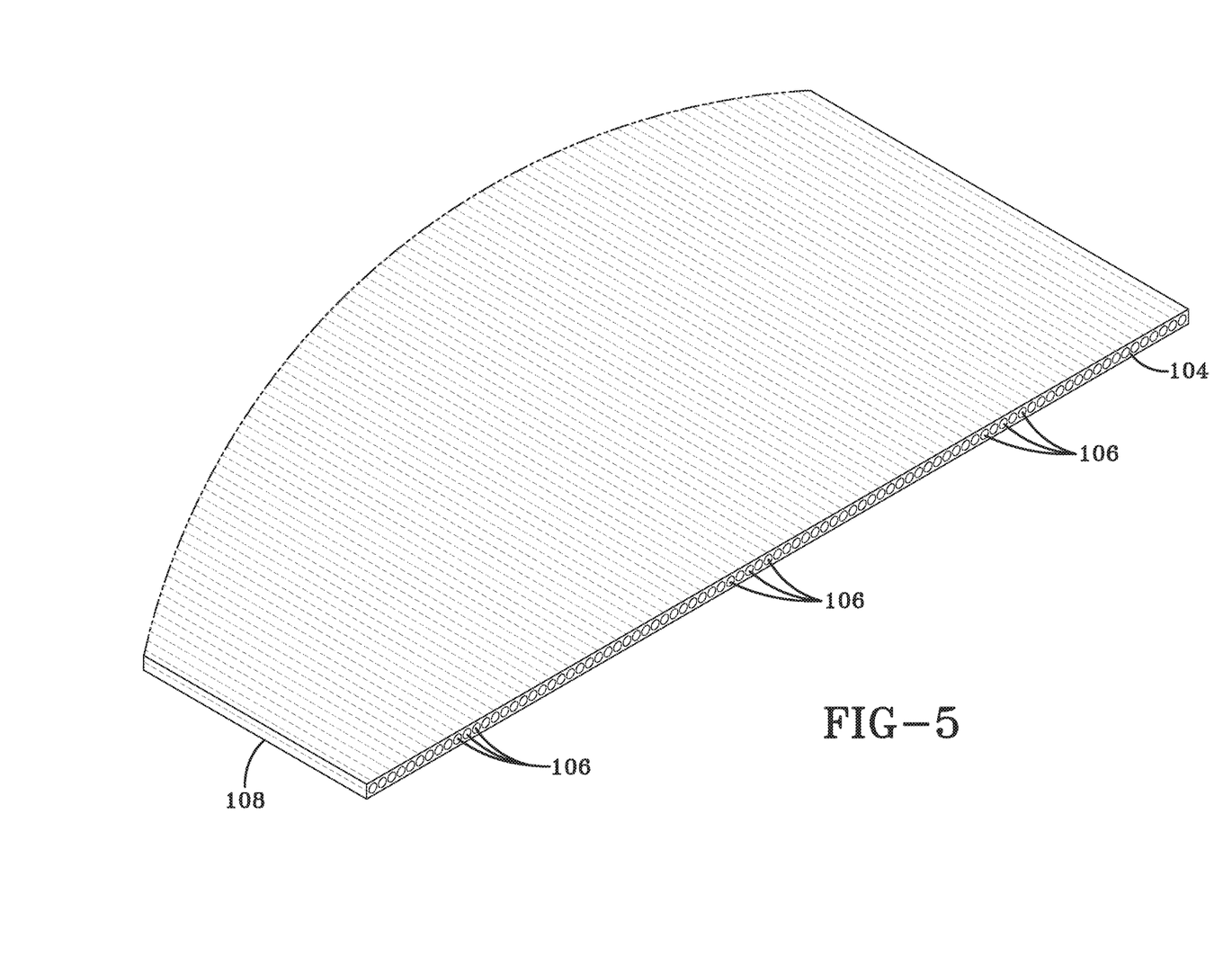
FIG. 5 is an enlarged perspective view of an end of an extruded ply indicated by the circle labeled as "5" in FIG. 1.

The shorter height of the first side wall 144 urges the flow of elastomer in a direction toward the second side wall 146, which aligns the flow of elastomer with a center C of the flow channel 130A, B to create a uniform melt through the cross section of the ply 108 (FIG. 5). It is to be understood that the particular difference between the height of the first side wall 144 and the second side wall 146 depends on the angle of the bend 148, and the size of the radius of the bend in each respective wall which is indicated in FIG. 4 as R1 and R2, respectively.

In this example, the angle of the bend 148 is 90 degree, and the size of the radius R1 of the bend on the first wall 144 is about 25 mm, while the size of the radius R2 of the bend on the second wall 146 is about 114 mm. Because characteristics such as the bend angle 148, the size of the radius R1, R2 of each wall 144, 146, respectively, and the width of the channel 130A, B, may vary depending on specific design considerations, the height of the first side wall 144 may be from about 10 percent to about 90 percent of the height of the second side wall 146. Preferably, the height of the first side wall 144 is from about 50 percent to about 80 percent of the height of the second side wall.

In this manner, the height of the second wall 146 compensates for slower material velocity by being higher or larger than the height of the first wall 144. With such a structure, the flow channel 130A, B of the crosshead die 100 orients the flow of elastomer in the desired direction and engineers the flow velocity distribution at its end-section such that the mass flow rate per unit width is the same across the width of the cross section 160.

Once the elastomer flows through the channel 130A, B, it flows through the opening 136 of the profile die 134, which sets the final thickness and width of the extruded ply 108. By feeding the profile die 134 at an optimum, uniform velocity, the flow channel 130A, B engenders a uniform coating thickness and exit velocity profile across the width of the opening 136 of the profile die thereby improving the uniformity of the extruded ply 108.

Figure 8:
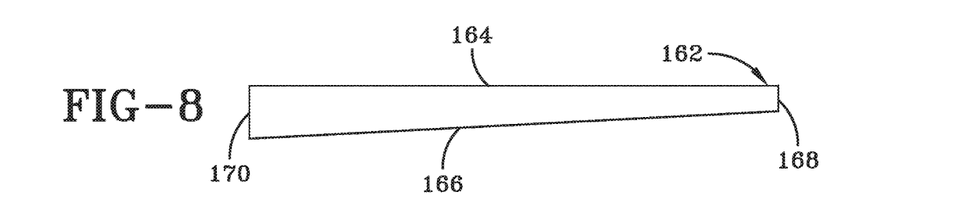
FIG. 8 is a schematic view of an alternate cross-sectional shape of a flow channel that was tested for a crosshead die.
Figure 9:
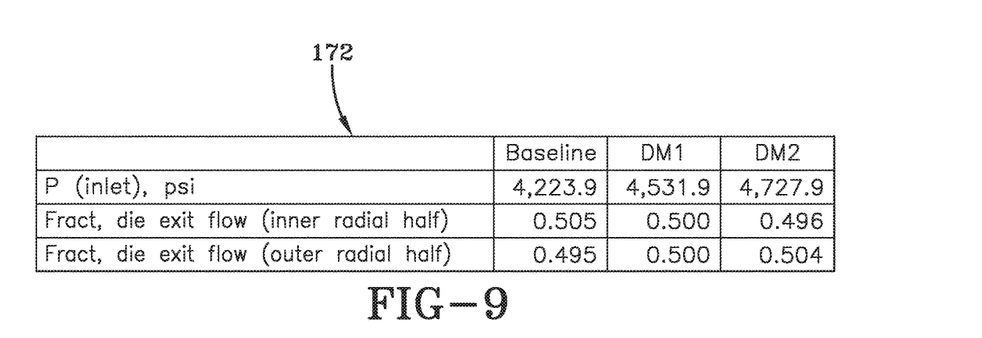
FIG. 9 is a table listing the results of flow testing of crosshead dies with the flow channels shown in FIGS. 6 through 8.

Finite element flow modeling of the crosshead die 100 of the present invention shows the favorable flow characteristics enabled by the improved cross section 160 of the die. Referring now to FIG. 9, a table 172 indicates flow modeling results for a crosshead die with a prior art rectangular cross section 150 (FIG. 6) as the "baseline", the crosshead die 100 of the invention with the cross section 160 (FIG. 7) as "DM1" and an additional crosshead die with a cross section 162 as "DM2". The cross section 162, which is shown in FIG. 8, included an upper wall 164 that was 80 mm long, a lower wall 166 that was about 83.8 mm long, a first side wall 168 that was about 5 mm high, and a second side wall 172 that was about 11 mm high. The flow channel for all three of the cross sections 150, 160, 162, included a 90 degree bend, a radius of about 25 mm formed in the first side wall 152, 144, 168, respectively, and a radius of about 144 mm formed in the second side wall, 154, 146, 170, respectively.

The table 172 shows the elastomer flow at the inner radial half of each cross section 150, 160, 162, which is adjacent the first side wall 152, 144, 168, respectively, and the elastomer flow at the outer radial half of each cross section, which is adjacent the second side wall 154, 146, 170, respectively. The flow is indicated as a fractional die flow, which is desired to be uniform for each half of the die. Since the total die flow is 100 percent, it is therefore desirable for the fractional die flow to be 50 percent, or 0.5, for each respective half of the die.

A crosshead die with the prior art rectangular cross section 150 had a fractional die flow of 0.505, compared to a slower fractional die flow adjacent the second side wall 154 of 0.495. In contrast, the crosshead die 100 of the invention with cross section 160 had a fractional die flow adjacent the first side wall 144 of 0.500, and an equal fractional die flow adjacent the second side wall 146 of 0.5. For a crosshead die with a more aggressive cross section 162 for the flow channel and the profile being tested, there was a fractional die flow adjacent the first side wall 168 of 0.496, and a faster fractional die flow adjacent the second side wall 170 of 0.504.

The results thus establish that the crosshead die 100 encourages material to flow from the inside, first side wall 144 toward the center C of the flow channel 130A, B, thereby providing a more uniform, symmetrical flow of elastomer than the prior art. The crosshead die 100 of the present invention thus balances the inner and outer radial volumetric flow rates in the flow channel 130A, B to achieve a much better uniformity in extruded coating thickness and velocity of the ply 108.

The principles of the crosshead die 100 of the present invention are easily extendable to flow channels of different shapes and dimensions without affecting the overall concept or operation of the invention. For example, the height of the first side wall 144 may be decreased, the height of the second side wall 146 may be increased, or a combination thereof. While it is preferable for the entire flow path 130A, B to be formed with the trapezoidal cross section 160, only a portion thereof may be formed in this manner without affecting the overall concept or operation of the invention.

The crosshead die 100 of the present invention enables the actual flow of the molten elastomer to be centered at a point that generally aligns with the center C of the flow channel, rather than being closer to the inside of the 90 degree bend of the flow channel, as was the case in the prior art. Because the actual flow of the extruded ply 108 is aligned with the center C of the flow channel, there is a uniform melt through the cross section of the ply, which optimizes the characteristics of the ply.

The present invention also includes a method of extruding a profile using an improved crosshead die. The method includes steps in accordance with the description that is presented above and shown in FIGS. 1 through 9.

It is to be understood that the structure of the above-described improved crosshead die 100 may be altered or rearranged, or components known to those skilled in the art omitted or added, without affecting the overall concept or operation of the invention. It is to be further understood that reference herein has been made to the extrusion of a ply or a ply coat for a tire by way of example, as the improved crosshead die 100 of the present invention applies to the extrusion of any profile.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A crosshead die for use with an extruder, the crosshead die comprising:
   a body;
   an inlet formed in the body, the inlet being in fluid communication with the extruder;
   an outlet formed in the body; and
   a flow channel formed in the body, the flow channel:
      including a length extending from the inlet to the outlet;
      being bounded by an upper wall, a lower wall, a first side wall, and a second side wall; and
      being formed with a bend, wherein the first side wall is disposed on an inside of the flow channel bend and the second side wall is disposed on an outside of the flow channel bend; and
   wherein a height of the first side wall is less than a height of the second side wall so that the flow channel is formed with a cross section that includes a trapezoidal shape, the trapezoidal shape extending for the length of the flow channel from the inlet formed in the body to the outlet formed in the body.

2. The crosshead die of claim 1, wherein the first side wall and the second side wall are parallel in relation to one another and the upper wall and the lower wall are oblique in relation to one another.

3. The crosshead die of claim 1, wherein the height of the first side wall is from about 10 percent to about 90 percent of the height of the second side wall.

4. The crosshead die of claim 3, wherein the height of the first side wall is from about 50 percent to about 80 percent of the height of the second side wall.

5. The crosshead die of claim 4, wherein the height of the first side wall is about 63.6 percent of the height of the second side wall.

6. The crosshead die of claim 1, wherein the flow channel bend is a 90 degree bend, the first side wall is formed with a first bend that includes a radius of about 25 millimeters, and the second side wall is formed with a second bend that includes a radius of about 114 millimeters.

7. The crosshead die of claim 1, further comprising a profile die removably mounted to the body at the outlet of the body.

8. The crosshead die of claim 1, further comprising a cassette received in the body for feeding reinforcement cords through the crosshead die.

\* \* \* \* \*